United States Patent [19]

Joerg et al.

[11] Patent Number: 5,671,637

[45] Date of Patent: Sep. 30, 1997

[54] SERVO-ASSISTED RACK-AND-PINION SYSTEM

[75] Inventors: Wolfgang Joerg, Stuttgart; Jaromir Bordovsky, Berglen; Aydogan Cakmaz, Stuttgart; Hubert Heck, Duesseldorf; Arno Roehringer, Ditzingen; Claus Gall, Fellbach; Reinhold Abt, Neuhausen; Rainer Strauss, Kaarst; Karl-Hans Koehler, Wernau, all of Germany

[73] Assignee: Mercedes-Benz AG, Germany

[21] Appl. No.: 564,978

[22] Filed: Nov. 30, 1995

[30] Foreign Application Priority Data

Nov. 30, 1994 [DE] Germany .................... 44 42 546.5

[51] Int. Cl.[6] .................................................. B62D 5/04
[52] U.S. Cl. .............................. 74/422; 74/29; 74/498; 180/444
[58] Field of Search ............................ 74/29, 33, 422, 74/498; 180/443, 444

[56] References Cited

U.S. PATENT DOCUMENTS 4,890,683  1/1990  Matsuda et al. ..................... 74/422 X
5,209,315  5/1993  Schlagmueller et al. ............. 180/444
5,450,916  9/1995  Budaker et al. ..................... 180/444

FOREIGN PATENT DOCUMENTS 39 33 771 A1   4/1991   Germany .
42 02 116 A1   7/1993   Germany .
42 03 335 A1   8/1993   Germany .
62-203785     12/1987   Japan .
6-144246       5/1994   Japan .
2 249 288      5/1992   United Kingdom .

*Primary Examiner*—Richard M. Lorence
*Attorney, Agent, or Firm*—Evenson, McKeown, Edwards & Lenahan, P.L.L.C.

[57] ABSTRACT

A servo-assisted rack-and-pinion steering system in which the rack is drive-coupled to a pinion which is mounted to move between two end positions in the longitudinal direction of the rack so that its movements control the servo motor. The end positions of the pinion are defined by two friction wheels which are driven continuously in opposite directions by the servo motor, in each case allowing an auxiliary force to be transmitted to the pinion.

16 Claims, 2 Drawing Sheets

SERVO-ASSISTED RACK-AND-PINION SYSTEM

BACKGROUND AND SUMMARY OF THE INVENTION

The present invention relates to a servo-assisted rack-and-pinion steering or control system, in which the rack is drive-coupled to a pinion mounted so as to be movable between two end positions in the longitudinal direction of the rack and the movements of which control the servo motor.

A rack-and-pinion steering system is described in DE 42 03 335 A1 and GB 22 49 288 A. There, the pinion is intended to be held at one of its axial ends by a self-aligning bearing, such that it can execute a certain swivelling motion in one or the other direction in the plane of the toothing of the rack depending on the direction of the forces acting between the pinion and rack. This swivelling motion is transmitted to the control elements of a servo valve arrangement which is used to control a hydraulic servo motor.

DE 42 02 116 A1 discloses a rack-and-pinion steering system in which an electric servo motor is provided which, via the worm gear mechanism, drives two clutch hubs, arranged coaxially with the pinion, in opposite directions. These clutch hubs interact with a common clamping sleeve, such that a drive connection with one or the other clutch hub is effected depending on the rotation of the pinion. The electric motor, which runs continuously in one direction, can accordingly generate an auxiliary force in one or the other direction to assist the respective steering manoeuvre as required.

DE 39 33 771 A1 describes a servo steering system in which the friction wheels are driven continuously in opposite directions. The rotary motion of the friction wheels is transmitted to the steered wheels by frictional engagement.

It is an object of the present invention to provide an electromechanically operating servo steering system of particularly simple construction. This object has been achieved according to the present invention by a rack-and-pinion steering system in which, in each end position, the pinion is coupled frictionally to one of two friction wheels which are driven continuously in opposite directions by a motor, i.e. an electric motor, and, between the end positions, the pinion is essentially decoupled from both friction wheels.

The present invention is based on the recognition of using a certain transverse mobility of the pinion to activate a mechanical drive connection between the servo motor and the pinion in the respectively required direction as a function of the direction and magnitude of the forces transmitted between the pinion and the rack.

It is particularly advantageous that the frictional engagement between the respective friction wheel and the pinion depends on the forces transmitted between the pinion and the rack and hence on a manual or actuating force generally acting on the pinion. At the same time, in addition to their role of power transmission to the pinion, the friction wheels also have the task of limiting the mobility of the pinion in the direction of the axis of the rack.

It is a further advantage of the present invention that the electric motor or the like serving as the servo motor can be preassembled as a complete unit together with the associated friction wheels to provide a power-assistance module for the steering system, and can then be mounted on the housing of the rack and pinion as a power-assistance unit.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
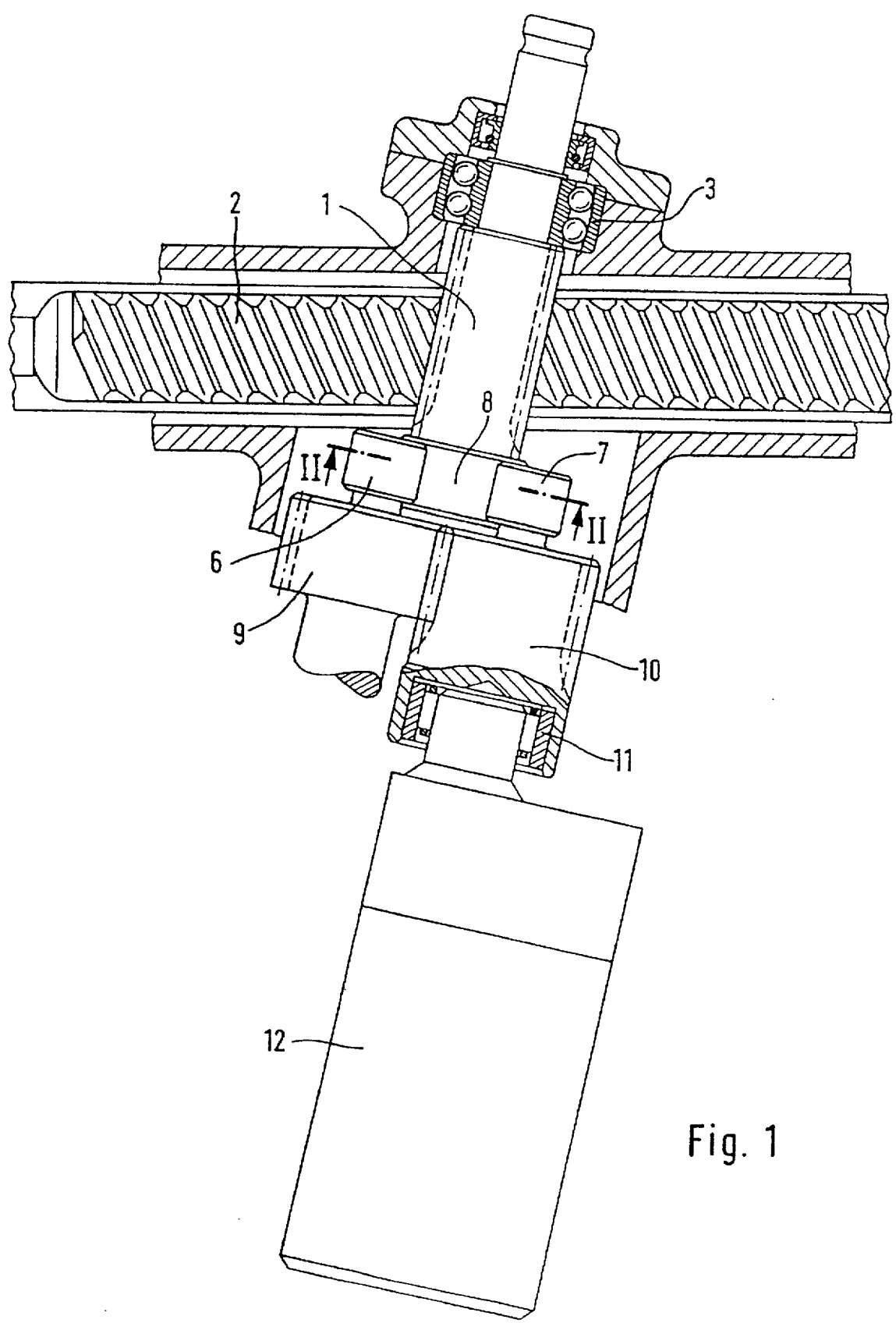
FIG. 1 is a plan view of the rack-and-pinion steering system of the present invention.

A pinion 1 connected rotationally in a known manner to a steering wheel (not shown) of a vehicle steering system meshes with a rack 2 which, for its part, controls in a known manner the steered wheels (likewise not shown) of the vehicle by way of a conventional steering linkage (not shown). The pinion 1 is rotatably mounted in a self-aligning bearing 3 so as to be movable sideways to a certain extent in the direction of the rack 2 in accordance with arrows 4, 5 in FIG. 2. The pinion 1 can be loaded into a central position by spring force in the same known manner as illustrated in the above-referenced GB 22 49 288 A which shows in FIG. 1 thereof a spring assembly.

The respective end positions of the pinion 1 are defined by friction wheels 6, 7, against which the pinion 1 comes to rest by way of a mating friction wheel 8 arranged thereon in a fixed manner. The mating friction wheel 8 is coupled frictionally to one of the friction wheels 6, 7 in each end position of the pinion 1 and is decoupled from both friction wheels 6, 7 in a central position of the pinion 1.

Each of the friction wheels 6, 7 is arranged torsionally rigid together with one of the gear wheels 9, 10 on a common shaft. Consequently, owing to the intermeshing gear wheels 8, 9, the friction wheels 6, 7 can only rotate in opposite directions.

Gear wheel 10 is driven in a predetermined direction by an electric motor 12 via a freewheel clutch 11. Because of the freewheel clutch 11, gear wheel 10 can continue to rotate if the electric motor 12 locks up. Gear wheel 10 can also rotate more quickly than the motor 12. The situation is fundamentally the same as regards gear wheel 9, although the rotation direction is the opposite.

Figure 2:
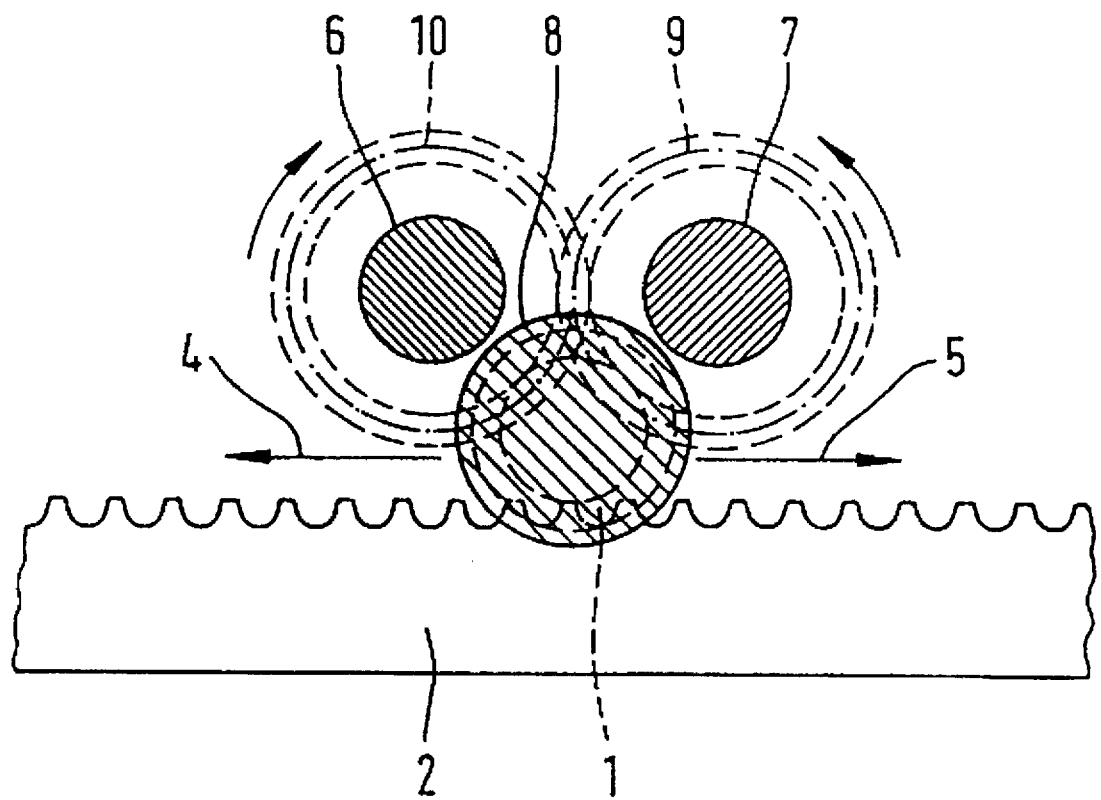
FIG. 2 is a cross-sectional view along line II—II of FIG. 1.

The mode of operation of the system is explained with reference to FIG. 2. Let the pinion 1 first of all be rotated in the clockwise direction by the steering wheel. That is, the rack 2 is displaced to the left. If this displacement takes place against a certain resistance (steering resistance), the pinion 1 is deflected in the rightward direction (arrow 5) and the mating friction wheel 8 comes to rest against friction wheel 7 with a greater or lesser degree of firmness. This contact enables friction wheel 7, which is driven by the electric motor 12 in the counterclockwise direction, to assist the rotation of the pinion 1 in the clockwise direction and hence the displacement of the rack 2 to the left (arrow 4).

If the pinion 1 is rotated in the counterclockwise direction by the manual or actuating force, there is a sideways displacement in the leftward direction (arrow 4), thereby establishing a frictional connection between friction wheel 6 and the mating friction wheel 8. Because the latter is driven in the clockwise direction, the electric motor 12 now assists the rotation of the pinion 1 in the counterclockwise direction, and the rack 2 is displaced to the right (arrow 5) with the assistance of the motor 12.

The freewheel clutch 11 ensures that the pinion 1 can be rotated by the manual or actuating force even when the electric motor 12 is locked up. When the non-self-locking electric motor 12 is stationary, it ensures that the pinion 1 can be rotated by the manual or actuating force without rotating the electric motor 12 at the same time.

Instead of the friction clutches formed by the friction wheels 6, 7 and the mating friction wheel 8, it is also possible to use hydrodynamic clutches or the like.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Rack and pinion system, comprising a longitudinally movably guided rack; a pinion arranged to mesh with the rack and be movable to an extent transversely with respect to an axis thereof in a longitudinal direction of the rack; a first friction wheel non-rotatably arranged on the pinion so as to move together therewith; a servo motor; and second and third friction wheels arranged on opposite sides and in the same plane of the first friction wheel to serve as end stops for lateral movement of the first friction wheel and the pinion, said second and third friction wheels being driven by the servo motor in mutually opposite rotating directions so that, in an end position of the first friction wheel and of the pinion, the servo motor transmits a torque in one direction and, in another end position of the first friction wheel and of the pinion, the servo motor transmit a torque in the other direction to the first friction wheel as well as the pinion.

2. The system according to claim 1, wherein the pinion is a spring-loaded pinion so as to be movable into a central position thereof.

3. The system according to claim 1, wherein the friction wheels interact with a mating friction wheel fixedly arranged on the pinion.

4. The system according to claim 3, wherein the pinion is a spring-loaded pinion so as to be movable into a central position thereof.

5. The system according to claim 1, wherein a module is comprised of the servo motor and the friction wheels so as to be mountable as a complete unit on a rack housing.

6. The system according to claim 5, wherein the pinion is a spring-loaded pinion so as to be movable into a central position thereof.

7. The system according to claim 6, wherein the friction wheels interact with a mating friction wheel fixedly arranged on the pinion.

8. The system according to claim 1, wherein a free wheel is arranged between the servo motor and the friction wheels.

9. The system according to claim 8, wherein the pinion is a spring-loaded pinion so as to be movable into a central position thereof.

10. The system according to claim 9, wherein the friction wheels interact with a mating friction wheel fixedly arranged on the pinion.

11. The system according to claim 10, wherein the motor, with the friction wheels, comprises a module mountable as a complete unit on a rack housing.

12. The system according to claim 1, wherein one of the friction wheels is arranged coaxially with a shaft of the motor, and both of the friction wheels are drive connected to one another by coaxial gear wheels.

13. The system according to claim 12, wherein the pinion is a spring-loaded pinion so as to be movable into a central position thereof.

14. The system according to claim 13, wherein the friction wheels interact with a mating friction wheel fixedly arranged on the pinion.

15. The system according to claim 14, wherein the motor, with the friction wheels, comprises a module mountable as a complete unit on a rack housing.

16. The system according to claim 15, wherein a free wheel is arranged between the motor and the friction wheels.

* * * * *